United States Patent [15] 3,670,181

Pauly [45] June 13, 1972

[54] SHIFTING PHASE IN A TELEVISION CAMERA

[72] Inventor: Donald E. Pauly, Salt Lake City, Utah

[73] Assignee: Telemation, Inc., Salt Lake City, Utah

[22] Filed: March 29, 1971

[21] Appl. No.: 128,839

[52] U.S. Cl. ....................307/262, 307/295, 328/155

[51] Int. Cl. ....................H03k 1/12

[58] Field of Search ....................307/254, 255, 257, 295, 262; 328/155

[56] References Cited

UNITED STATES PATENTS

| | | | |
|---|---|---|---|
| 2,942,124 | 6/1960 | Kistler | 307/295 X |
| 3,182,210 | 5/1965 | Jebens | 307/254 |
| 3,187,195 | 6/1965 | Stefanov | 307/295 |
| 3,212,013 | 10/1965 | Hillis | 307/262 X |
| 3,514,720 | 5/1970 | Roucache et al. | 307/262 X |

*Primary Examiner*—John S. Heyman
*Attorney*—Lynn G. Foster

[57] ABSTRACT

Methods and apparatus for electrical phase shifting comprising a pair of transistor phase modulator circuits having the collectors of the transistors in each of the modulator circuits connected in a parallel summing relation to the collectors of the corresponding transistors in the other modulator circuit. The base of each transistor is biased with a square wave signal in a manner such that the phase of the signal applied to each transistor is 180° out of phase with the bias signal applied to the other transistor of the same modulator and is 90° out of phase with the bias signal applied to either of the transistors in the other modulator. A transistor bridge input circuit is provided which permits the value of the circuit input to be a known voltage multiplied by the number of degrees of phase shift desired.

6 Claims, 2 Drawing Figures

INVENTOR.
DONALD E. PAULY
BY
Lynn G. Foster
ATTORNEY

INVENTOR.
DONALD E. PAULY
BY Lynn G. Foster
ATTORNEY

SHIFTING PHASE IN A TELEVISION CAMERA

BACKGROUND

1. Field of Invention

This invention relates to phase shifting circuits and is particularly directed to automatic phase shifting circuits which are infinitely variable.

2. Prior Art

Devices for shifting the phase of electrical signals have found numerous uses in television and radio broadcasting, navigation, and the like. However, the phase shifting devices of the prior art have often employed circuits which required resistors, capacitors, and similar components in critical portions of the circuits. Unfortunately, such components often tend to change values with variations in temperature and, hence, produce undesired changes in the output signal. Other prior art devices have been mechanical apparatus which required frequent adjustment calling for expensive test equipment and highly skilled technicians. Moreover, it must be remembered that anything which can be adjusted, can also be misadjusted. Furthermore, the phase shifting devices of the prior art have generally been designed to change a signal from one specific phase to another specific phase and have only been able to vary from these specific phases by fractions of a degree.

BRIEF SUMMARY AND OBJECTS OF THE INVENTION

The mentioned disadvantages of the prior art are overcome with the present invention and a phase shifting circuit is provided which is infinitely variable over a wide range of phases and with which such variations may be made quickly and easily by unskilled or semi-skilled workmen without the use of expensive test equipment.

The advantages of the present invention are preferably attained by providing a pair of transistorized balanced modulator circuits wherein the collectors of the transistors in one of the modulator circuits are connected in a parallel summing arrangement with the collectors of the corresponding transistors in the other modulator circuit and the base of each of the transistors is biased by a signal which is 180° out of phase with the base bias supplied to the other transistor of the same modulator circuit and in quadrature with the base biases supplied to either of the transistors in the other modulator circuit. In addition, a bridge-type input circuit is provided to permit variation of the proportions of the input signal values fed to the respective modulator circuits.

Accordingly, it is an object of the present invention to provide improved high frequency phase shifting means.

Another object of the present invention is to provide high frequency, phase shifting means which are automatically variable over a wide range of phases.

An additional object of the present invention is to provide high frequency, phase shifting means which does not employ temperature-sensitive components in critical portions of the circuit.

A further object of the present invention is to provide high frequency, phase shifting means which is readily variable over a wide range of phases without requiring the use of expensive test equipment and highly skilled technicians.

Another object of the present invention is to provide high frequency, phase shifting means comprising a pair of transistorized blanced modulator circuits wherein the collectors of the transistors in one of the modulator circuits are connected in a parallel summing arrangement with the collectors of the corresponding transistors in the other modulator circuit and the base of each of the transistors is biased by a signal which is 180° out of phase with the base bias supplied to the other transistor of the same modulator circuit and in quadrature with the base biases supplied to either of the transistors in the other modulator circuit; together with a bridge-type input circuit to permit variation of the proportions of the input signal values fed to the respective modulator circuits.

These and other objects and features of the present invention will be apparent from the following detailed description taken with reference to the accompanying drawings.

DETAILED DESCRIPTION OF THE ILLUSTRATED EMBODIMENT

Figure 1:
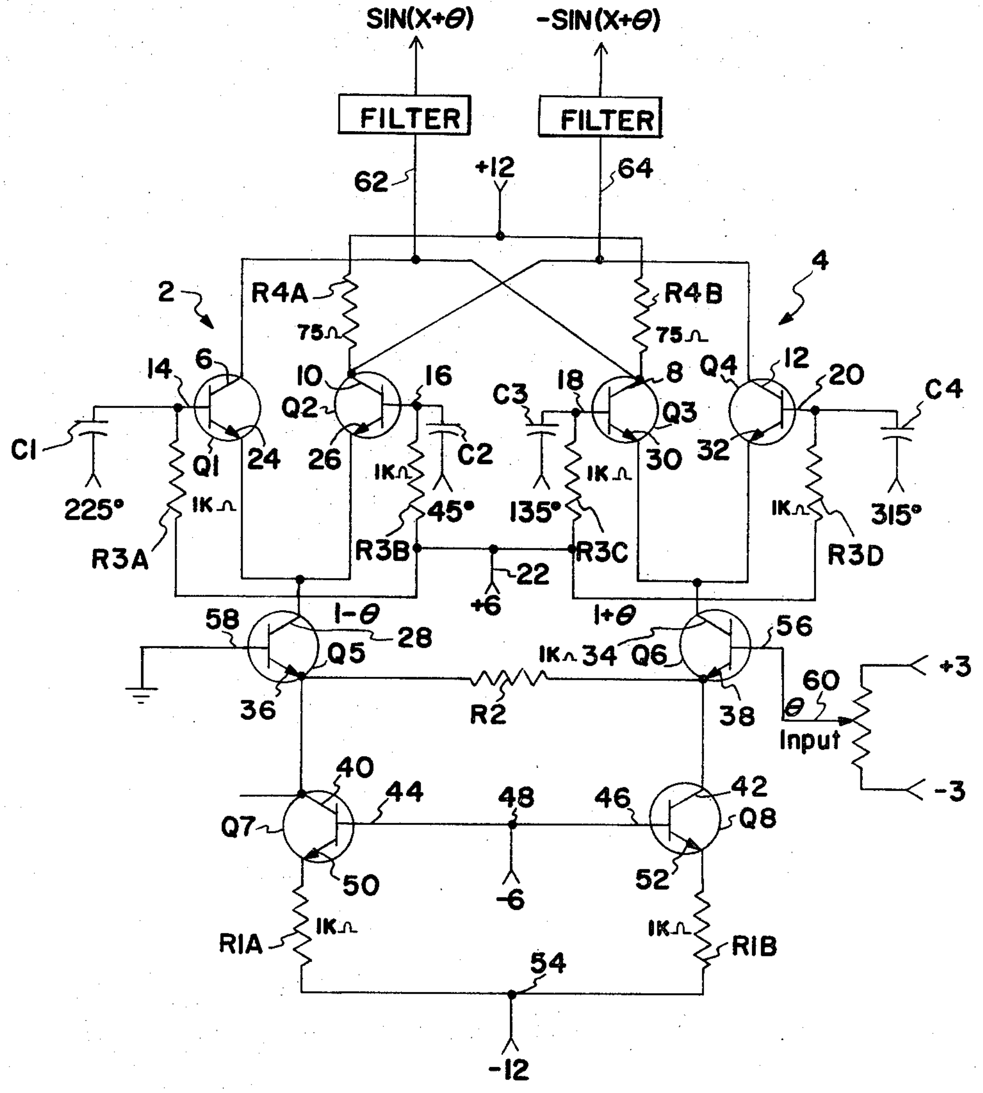
FIG. 1 is a diagrammatic representation of a phase shifting circuit embodying the present invention.

In that form of the present invention chosen for purposes of illustration, FIG. 1 shows an electrical phase shifting circuit comprising a pair of phase modulator circuits, indicated generally at 2 and 4, respectively. Phase modulator 2 includes transistors Q1 and Q2, while modulator 4 includes transistor Q3 and Q4. The collector 6 of transistor Q1 is connected to the collector 8 of transistor Q3. Similarly, the collector 10 of transistor Q2 is connected to the collector 12 of transistor Q4. The base electrodes 14, 16, 18, and 20 of transistors Q1, Q2, Q3, and Q4, respectively, are each supplied with a 6 bolt bias from common source 22 through resistors R3A, R3B, R3C, and R3D, respectively. Moreover, each of the base electrodes 14, 16, 18, and 20 is biased with a square wave signal of about 0.4 volts peak-to-peak amplitude through respective capacitors C1, C2, C3, and C4. However, as indicated in FIG. 1, the phase of the square wave signal applied to each of the respective transistors Q1, Q2, Q3, and Q4 is 180° out of phase with that applied to the other transistor of the same modulator circuit and in quadrature with that applied to either of the transistors of the other modulator circuit. Thus, the phase of the square wave applied to the base 16 of the transistor Q2 in modulator circuit 2 is 45°, which is 180° out of phase with the 225° phase of the square wave applied to base 14 of transistor Q1 of modulator 2, and is in quadrature with either the 135° phase of the square wave applied to base 18 of transistor Q3 or the 315° phase of the square wave applied to base 20 of transistor Q4 in modulator 4. The emitters 24 and 26 of transistors Q1 and Q2, respectively, are fed by signals from the collector 28 of transistor Q5, while the emitters 30 and 32 of transistors Q3 and Q4, respectively, are fed by signals from the collector 34 of transistor Q6. Transistors Q5 and Q6 have their emitters 36 and 38, respectively, connected together through resistor R2. In addition, the emitter 36 of transistor Q5 is connected to collector 40 of transistor Q7, while the emitter 38 of transistor Q6 is connected to the collector 42 of transistor Q8 and the base electrodes 44 and 46 of transistors Q7 and Q8, respectively, are connected together to a common biasing source of –6 volts, as seen at 48. In addition, the emitters 50 and 52 of transistors Q7 and Q8, respectively, are connected through respective resistors R1A and R1B to a common biasing source of –12 volts, as seen at 54. Finally, the base electrode 58 of transistor Q6 is grounded, while the base electrode 56 of transistor Q5 is supplied with the circuit input signal through a potentiometer 60 or the like. It will be seen that the circuit formed by the connections of transistors Q5, Q6, Q7, and Q8 forms a bridge circuit wherein the collector currents from transistors Q5 and Q6 will be determined by the potentials of their emitters 36 and 38, respectively, and the potential drop across resistor R2.

In operation, it can be shown that $(1 - \tan\theta)\sin(x - 45°)$ $(1 + \tan\theta)\cos(x - 45°) = \sqrt{2}\sin(x + \theta)$. Therefore, if we can generate a sine wave of amplitude $(1 - \tan\theta)$ and a cosine wave of amplitude $(1 + \tan\theta)$, the sum of these will be a sine wave whose phase is a function of $\theta$ and whose amplitude is constant. In practice, if $\theta$ is small, $\theta$ may be substituted for $\tan\theta$, where $\theta$ is in radians. This is usually easier to accomplish than the generation of $\tan\theta$. It can then be shown that $(1 - \theta)\sin(x - 45°) + (1 + \theta)\cos(x - 45°) = \sqrt{2(1 + \theta^2)}\sin(x + \tan^{-1}\theta)$. If $22.5° > \theta > -22.5°$ resultant amplitude change in the preceding equation is less than 7.5 percent and phase unlinearity is less than 1°. In order to accomplish this, Q7 and Q8 are used as current sources of approximately 6 milliamps. Their bases 44 and 46 are biased at −6 V. Since the transistors are silicon devices we may assume the voltage drop from base to emitter to be about 0.6 volt. Therefore the drop across R1A and R1B will be very nearly 6 volts and the current through them about 6 milliamps. Since the betas of Q7 and Q8 are about 500, the base current is negligible and nearly all their emitter current flows into their collectors 40 and 42 and thence into the emitters 36 and 38 of Q5 and Q6, respectively.

If both the base 58 of Q5 and the base 56 of Q6 are at the same potential there will be no voltage drop across R2 and therefore no current through it. In this case, the current in the collectors 28 and 34 of Q5 and Q6 will be equal. If there is a potential across R2, current will be diverted from the least positive emitter 36 or 38 to the most positive emitter. The collector currents of Q5 and Q6 will therefore be altered from their earlier equal values.

If we assume one unit of current is the current through R1A or R1B and one unit of voltage across the input 60 is the same as the voltage across R1A or R1B, the collector current of Q5 may be written as $(1-\theta)$ and the collector current of Q6 may be written as $(1+\theta)$. Since, as noted above, the voltage across R1A and R1B is 6 volts, the value of the input 60 should be 6 volts for each radian of phase shift desired. Once the potentiometer 60 is calibrated for this, subsequent changes of phase may be accomplished by simply setting the potentiometer 60 to the voltage corresponding to the desired phase.

As indicated above, the collector 6 or transistor Q1 is connected to the collector 8 or transistor Q3. This causes the collector currents of transistors Q1 and Q3 to be added at the output 62. Similarly, the collector 10 of transistor Q2 is connected to the collector 12 of transistor Q4 and the collector currents of transistors Q2 and Q4 will be added at output 64.

Since opposite phased square waves are applied to the bases of Q1 and Q2, as well as Q3 and Q4; only Q1 or Q2 in one case, or Q3 or Q4 in the other, can be conducting at once. The bases of Q1, Q2, Q3 and Q4 are biased at +6v by R3A, R3B, R3C and R3D respectively. This provides about 6 volts of collector voltage for Q5 and Q6. Square waves of about 4/10ths volt peak-to-peak amplitude are applied to the bases of Q1, Q2, Q3, and Q4 through C1, C2, C3, and C4 respectively, This drives each transistor alternately into conduction and cutoff. The collector current of the four transistors Q1, Q2, Q3, and Q4 is therefore either the value of the current in Q5 or Q6, as the case might be, or zero. That is, the peak-to-peak amplitude of the collector current in Q1 and Q2 is the collector current of Q5 or $(1+\theta)$, and the peak-to-peak amplitude of the collector current in Q3 and Q4 is the collector current of Q6 or $(1+\theta)$.

Figure 2:
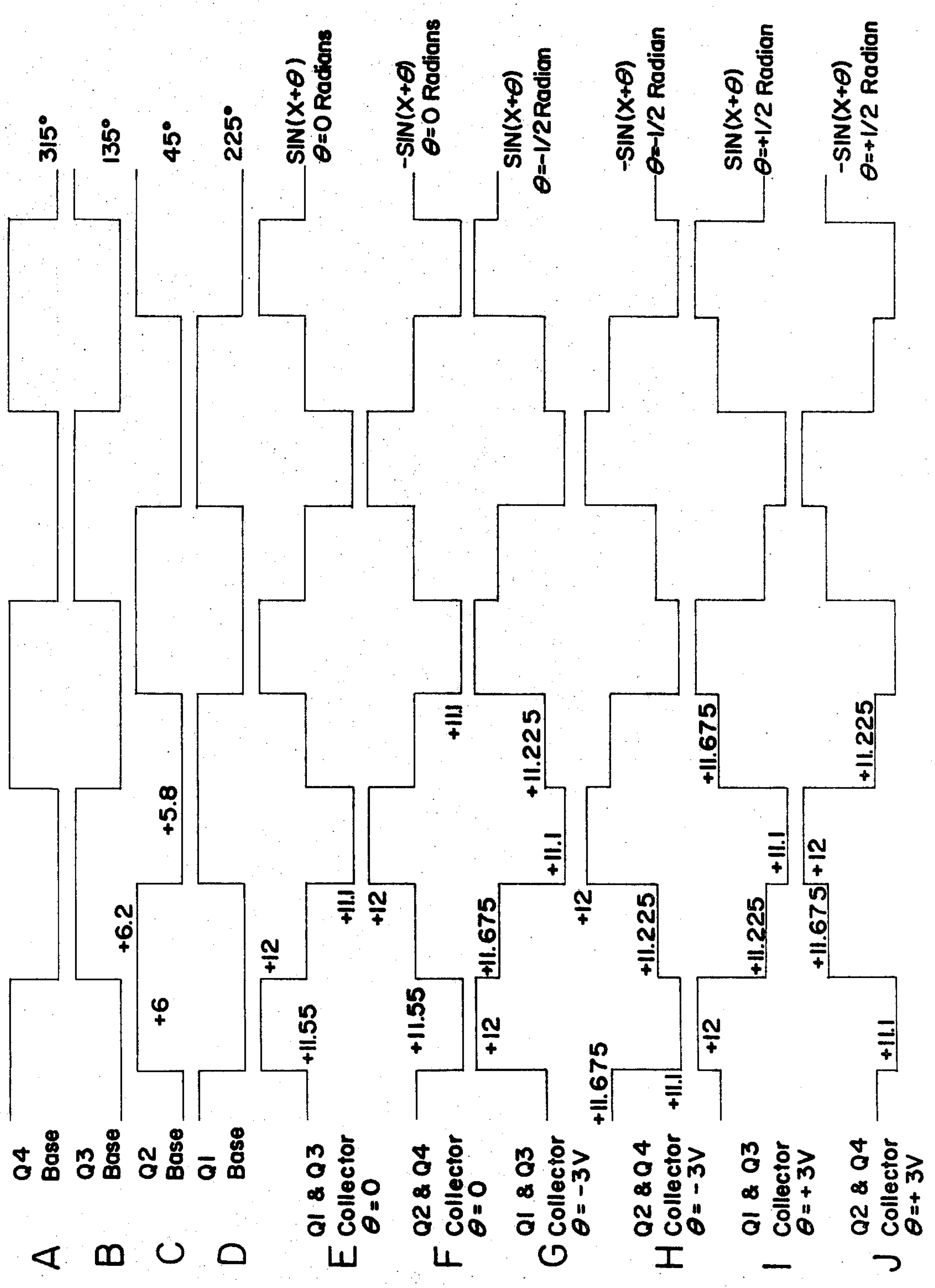
FIG. 2 is a chart showing the signals appearing at designated points in the circuit of FIG. 1 as functions of time.

Since Q1 and Q3 are fed by square waves in quadrature, they will at times both be on or off, and at times be in a condition where only one or the other is conducting. This will give a three level signal in the collector, as seen in curve E of FIG. 2, whose shape will depend upon the relative amounts of conduction of Q1 and Q3. If the conduction of Q1 is not equal to that of Q3 the collector will exhibit a four level signal as seen in curves G or I of FIG. 2. After the inversion in Q1 and Q3, the collector voltage component consists of a 45° and a 315° signal respectively. Also, after the inversion in Q2 and Q4, the collector voltage component consists of a 225° and a 135° signal respectively. Since each component has an amplitude proportional to $(1-\theta)$ and $(1+\theta)$ respectively, they fill the aforementioned requirements for phase modulation giving outputs proportional to $\sin(x+\theta)$ and $-\sin(x+\theta)$. The phase linearity is within one degree up to a 22.5°. If better phase linearity is desired an input of $\tan\theta$ may be substituted for $\theta$. This will also prevent any amplitude change as $\tan\theta$ is varied.

Obviously, numerous variations and modifications can be made without departing from the invention. Therefore, it should be clearly understood that the form of the present invention described above and shown in the accompanying drawing is illustrative only and is not intended to limit the scope of the invention.

I claim:

1. A phase shifting device comprising:

a pair of transistor phase modulator circuits, each of said modulator circuits including two transistors and having the collectors of the transistors in each of the modulator circuits connected to the collectors of the corresponding transistors in the other modulator circuit:

means applying square wave biasing signals to the base of each of the transistors in said pair of modulator circuits in a manner such that the phase of said square wave signal applied to each of said transistors is 180° out of phase with the square wave signal applied to the other transistor in the same modulator circuit and in quadrature with the square wave signals applied to either of the transistors in the other modulator circuit;

a bridge-type input circuit connected to supply input signals to said pair of phase modulator circuits and serving to vary the ratios of said input signals in response to variations in the circuit input signal; and differential input means supplying a circuit input signal to said bridge-type input circuit.

2. The device of claim 1 wherein said bridge-type circuit is a transistor bridge circuit comprises:

first, second, third, and fourth transistors;

a first resistor connecting the emitters of said first and second transisto;:

means connecting the emitter of said first transistor to the collector of said third transistor;

means connecting the emitter of said second transistor to the collector of said fourth transistor;

a first biasing source connected to the bases of said third and fourth transistors;

a second biasing source;

a pair of identical resistors each connecting said second biasing source to the emitter of a respective one of said third and fourth transistors; and differential input means connected to the bases of said first and second transistors.

3. A phase shifting device comprising:

a pair of transistor phase modulator circuits having the collectors of the transistors in each of the modulator circuits connected to the collectors of the corresponding transistors in the other modulator circuit;

means applying square wave biasing signals to the base of each of the transistors in said pair of modulator circuits in a manner such that the phase of said square wave signal applied to each of said transistors is 180° out of phase with the square wave signal applied to the other transistor in the same modulator circuit and in quadrature with the square wave signals applied to either of the transistors in the other modulator circuit;

a bridge-type input circuit connected to supply input signals to said pair of phase modulator circuits and serving to vary the ratios of said input signals in response to variations in the circuit input signal, said bridge-type circuit comprising:

first, second, third, and fourth transistors;

a first resistor connecting the emitters of said first and second transistor;

means connecting the emitter of said first transistor to the collector of said third transistor;

means connecting the emitter of said second transistor to the collector of said fourth transistor;

a first biasing source connected to the bases of said third and fourth transistors:

a second biasing source;

a pair of identical resistors each connecting said second biasing source to the emitter of a respective one of said third and fourth transistors; and differential input means connected to the bases of said first and second transistors.

4. The device of claim 3 wherein:

said collectors are connected in a parallel summing relation; and a respective output means is connected to receive summed currents from each pair of collector-connected transistors.

5. The device of claim 3 wherein:

the value of the circuit input signal supplied by said differential input means is equal to the voltage drop across said pair of identical resistors multiplied by the number of degrees of phase shift desired.

6. The method of phase shifting signals, said method comprising the steps of:

generating a differential input signal having a magnitude indicative of the number of degrees of phase shift desired;

dividing said signal into two separate signals having magnitudes which are inversely related to each other and which are determined by the polarity of said input signal;

generating two pairs of square wave signals such that each of said signals is 180° out of phase with the other signal of the same pair and in quadrature with either of the signals of the other pair;

modulating each of said separate signals with the signals of a respective one of said two pairs of square wave signals; and establishing an output signal which is the parallel sum of the modulated separate signals.

* * * * *